United States Patent [19]

Rooney et al.

[11] Patent Number: 4,525,232

[45] Date of Patent: Jun. 25, 1985

[54] POLYMERIZABLE ACRYLIC COMPOSITIONS HAVING VINYL ETHER ADDITIVE

[75] Inventors: John M. Rooney, Naas; John Woods, Stillorgan, both of Ireland; Paul Conway, Bury St. Edmunds, England

[73] Assignee: Loctite (Ireland) Ltd., Tallaght, Ireland

[21] Appl. No.: 600,626

[22] Filed: Apr. 16, 1984

[51] Int. Cl.³ .............................................. B29C 19/04
[52] U.S. Cl. .............................. 156/273.3; 156/273.7; 156/275.7; 156/332; 526/171; 204/159.24
[58] Field of Search ................. 156/332, 275.5, 275.7; 526/171; 204/159.24

[56] References Cited

U.S. PATENT DOCUMENTS

| | | | |
|---|---|---|---|
| 3,424,638 | 1/1969 | Marans | 156/275.5 |
| 3,702,812 | 11/1972 | McGinniss et al. | 204/159.24 |
| 3,855,040 | 12/1974 | Malofsky | 156/310 |
| 4,245,029 | 1/1981 | Crivello | 204/159.24 |
| 4,451,615 | 5/1984 | Charnock | 156/332 |

FOREIGN PATENT DOCUMENTS

| | | | |
|---|---|---|---|
| 3010373 | 1/1981 | Fed. Rep. of Germany | 526/334 |
| 51-56891 | 5/1976 | Japan | 526/209 |

*Primary Examiner*—Joseph L. Schofer
*Assistant Examiner*—Peter F. Kulkosky
*Attorney, Agent, or Firm*—Walter J. Steinkraus; Eugene F. Miller

[57] ABSTRACT

Polymerization of acid activated compositions of acrylic monomers, peroxy initiators and ferrocene derivatives is inhibited by addition of 0.5–20% of a vinyl ether monomer. Bulk compositions activated by addition of a strong acid can be provided with a desired polymerization induction time directly related to the concentration of the vinyl ether. Compositions containing compounds which decompose to a strong acid upon exposure to actinic radiation, thereby activating polymerization, have increased shelf lives when vinyl ethers are included therein. The use of vinyl ether monomers having a functionality of two or more also provides increased adhesive bond strength after curing.

17 Claims, No Drawings

POLYMERIZABLE ACRYLIC COMPOSITIONS HAVING VINYL ETHER ADDITIVE

BACKGROUND OF THE INVENTION

The present invention pertains to acrylic monomer compositions which utilize a ferrocene/peroxy initiator/strong acid initiation system. As used herein, the term acrylic monomers refers to compounds having groups of the formula $CH_2=C(R)-C(=O)-O-$ where R is H or alkyl.

In U.S. Pat. No. 3,753,927, there are described promoter systems for peroxide cured unsaturated polyester resins which include certain ferrocene compounds having carbonyl containing substituents.

In U.S. Pat. No. 3,855,040 to Malofsky, it is disclosed that combinations of a ferrocene compound, a strong acid and a peroxy compound are effective initiators of acrylic monomer compositions.

In U.S. Pat. No. 4,076,742, anaerobic compositions utilizing an oligocarbonate acrylate, benzoyl peroxide, ferrocene and a specified inhibitor are described.

In co-pending patent application, Ser. No. 515,540, filed July 20, 1983, there are described radiation activatable adhesive compositions comprising an acrylic monomer, a peroxy initiator, a ferrocene and a compound which decomposes on exposure to actinic radiation to release a strong acid, thereby activating anaerobic cure of the system.

SUMMARY OF THE INVENTION

The present invention is an improvement in the acid activated acrylic monomer/ferrocene/peroxy initiator systems of U.S. Pat. Nos. 3,855,040 and co-pending application 515,040, filed July 20, 1983, the disclosures of which are incorporated herein by reference. Specifically, the present invention is an activated composition comprising (a) an acrylate monomer, (b) a peroxy free radical initiator, (c) a ferrocene compound, and (d) 0.5–20% by weight of the curable composition ingredients of a vinyl ether monomer.

The vinyl ether in the inventive compositions acts as a novel cure inhibitor which provides controllable pot life to systems activated by added acid as in U.S. Pat. No. 3,855,040 and increases the stability of light activated compositions. The use of difunctional or polyfunctional vinyl ethers in the inventive compositions provides increased adhesive bond strengths after curing.

DETAILED DESCRIPTION OF THE INVENTION

Specific examples of the acrylic monomers utilizable in the inventive compositions include di- and poly-(meth)acrylate (i.e., acrylate and methacrylate)esters and monofunctional (meth)acrylate esters having a polar group selected from labile hydrogen, heterocyclic ring, hydroxy, amino, cyano, and halogen groups, such as the acrylic esters as described in columns 3 and 4 of U.S. Pat. No. 3,855,040, (meth)acrylate functional urethane block copolymers such as described in U.S. Pat. Nos. 4,018,851, 4,295,909 and 4,309,526, also incorporated herein by reference, and acrylic functional silicone resins.

Examples of peroxy initiators usable in the inventive compositions include the peroxy compounds mentioned at columns 4 and 4 of U.S. Pat. No. 3,855,040. Preferred peroxy compounds are organic hydroperoxides, such as cumene hydroperoxide, t-butyl hydroperoxide and methyl ethyl ketone hydroperoxide. The peroxy initiators are recommended to be used at levels between about 0.1% and 10% by weight, preferably between about 0.5% and 5% by weight of the total composition.

The ferrocene compounds usable in the inventive compositions are also described in U.S. Pat. No. 3,855,040 and include ferrocene (dicyclopentadienyl iron) and ferrocene derivatives having substituents on one or both cyclopentadienyl rings, such as acetyl ferrocene, benzoyl ferrocene, hydroxyethyl ferrocene, butyl ferrocene, 1,1-dibutyl ferrocene and polymers having ferrocene moieties incorporated therein, such as the polymers described at column 12, lines 3 et seq of U.S. Pat. No. 3,855,040.

The acid activators may be strong acids, preferably an acid having a small pKa less than about 3.0, preferably less than 2.0, and most preferably 1.5 or less. The acid should be reasonably soluble and the remainder of the composition to facilitate distribution throughout the polymerizable mixture. While not absolutely essential, it is preferably for the acid to be an organic acid. Typical examples are sulfonic acids such as toluene sulfonic acid, nitrotoluene sulfonic acid and propane sulfonic acid; dichloro- and trichloroacetic acids; phosphonic acids such as benzene phosphonic acid. Other useful acids include acetic, maleic, malonic, acetylene carboxylic, and acetylene dicarboxylic acids and saccharin.

The acid activator may also be formed in situ by radiation induced decomposition of a compound which decomposes to form a strong acid. Such compounds include salts of a complex halogenide having the formula $$[A]_d{}^+[MX_e]^{-(e-f)},$$

where A is a cation selected from the group consisting of iodonium sulfonium, thiopyrylium and diazonium cations, M is a metalloid, and X is a halogen radical, b equals e minus f, f equals the valance of M and is an integer equal to from 2 to 7 inclusive, e is greater than f and is an integer having a value up to 8. Suitable compounds are described in more detail in the aforementioned copending application No. 515,540. Examples include di-p-tolyl iodonium hexafluorophosphate, diphenyl iodonium hexafluorophosphate, diphenyl iodonium hexafluoroarsenate and UVE 1014 (trademark of General Electric), a commercially available sulfonium salt of a complex halogenide. The salts of the complex halogenides may be incorporated into the adhesive compositions of the present invention at concentrations of about 0.05 to about 15.0% by weight and preferably about 0.075 to about 3.0% by weight of the total composition.

The vinyl ether additives which are present in the inventive compositions at levels of between 0.5 and 20% by weight of the composition may be represented by the formulas: $(CH_2=CH-O-CH_2)_n-G$; $(CH_2=CH-O-C_6H_4)_n-G$; $(CH_2=CH-O-CR^1=CR^2)_n-G$; or $(CH_2=CH-O-C\equiv C)_n-G$, or ketene acetals such as those of the formulas:

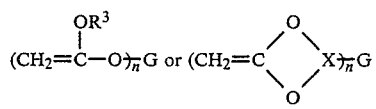

where G is a mono or multivalent radical free of groups, such as amino, substituted amino or phenol which interfere with cationic or free radical polymerization; n is an integer greater than or equal to one; $R^1$ and $R^2$ are selected from H, alkyl, substituted alkyl, aryl, and substituted aryl; $R^3$ is selected from alkyl, substituted alkyl, aryl and substituted aryl; and Y is a hydrocarbonyl group of 1–5 carbon atoms. Polyfunctional vinyl ethers are preferred.

The invention is illustrated by the following nonlimiting examples.

EXAMPLE 1

A formulation was prepared consisting of 40.72 grams of polyethylene glycol dimethacrylate (the dimethacrylate ester of polyethylene glycol of molecular weight 200), 0.493 grams of ferrocene, and 1.058 grams of cumene hydroperoxide. Aliquots of 3.75 grams of the above formulation were poured into three 12×75 mm Pyrex test tubes. To the first test tube 4 drops from a Pasteur pipette of a 0.1N solution of perchloric acid in glacial acetic acid were added. Polymerization of the contents occurred in less than two minutes. To the second tube 0.15 grams of n-butyl vinyl ether was added and mixed thoroughly; 4 drops of a 0.1N solution of perchloric acid in glacial acetic acid were then added. Polymerization of the contents occurred in 5 minutes. To the third tube 0.33 grams of n-butyl vinyl ether was added and mixed thoroughly, 4 drops of a 0.1N solution of perchloric acid in glacial acetic acid were then added. Polymerization of the contents occurred in 15–30 minutes.

EXAMPLE 2

A formulation was prepared consisting of 40.3 grams of polyethylene glycol dimethacrylate (the diemthacrylate ester of polyethylene glycol of molecular weight 200), 0.34 grams of tert-octyl ferrocene and 0.554 grams of cumene hydroperoxide. Aliquots of 3.75 grams of the above formulation were poured into two 12 mm×75 mm Pyrex test tubes. To the first test tube 4 drops from a Pasteur pipette of a 0.1N solution of perchloric acid in glacial acetic acid were added. Polymerization of the contents occurred in 1–2 minutes. To the second tube 0.34 grams of n-butyl vinyl ether was added and mixed thoroughly; 4 drops of a 0.1N solution of perchloric acid in glacial acetic acid were then added. Polymerization of the contents occurred in 5–10 minutes.

EXAMPLE 3

A formulation was prepared consisting of 10.0 grams of hydroxypropyl methacrylate; 36.06 grams of a mixture of two related urethane-acrylate resins comprising: (i) a block copolymer prepared by first reacting a flexible polymeric methylene ether diol with a molar excess of diisocyanate such as toluene diisocyanate so that the product had an —NCO group at each end of the diol, the product of this reaction being reacted with a molar equivalence of a hydroxyalkyl methacrylate to form a flexible dimethacrylate block copolymer as disclosed in Baccei, U.S. Pat. No. 4,309,526 and (ii) a urethane-acrylate resin of the type disclosed in U.S. Pat. No. 3,425,988; 1.0 gram of cumene hydroperoxide; 0.015 grams of tetra sodium ethylenediamine tetraacetate; 0.46 grams of ferrocene; and 0.15 grams of di-p-tolyl iodonium hexafluorophosphate. This formulation will be referred to as Formulation A.

A second formulation was prepared in which 30.0 grams of formulation A was mixed with 0.5 grams of 1,4-butanediol divinyl ether. This formulation will be referred to as Formulation B.

A third formulation was prepared in which 30.0 grams of formulation A was mixed with 1.5 grams of 1,4-butanediol divinyl ether. This formulation will be referred to as Formulation C.

A fourth formulation was prepared in which 30.0 grams of formulation A was mixed with 3.0 grams of 1,4-butanediol divinyl ether. This formulation will be referred to as Formulation D.

Pairs of mild steel grit blasted lapshears, 2 centimeters wide, were coated in one face with the formulations outlined above and irradiated at 50 mw/cm² (measured at 365 nm) for 30 seconds. The coated surfaces of each pair were firmly placed in contact either immediately after the cessation of irradiation or 5 minutes after the cessation of irradiation. In each case a 0.5 inch overlap in the length direction of the lapshear was prepared and the bonds left for 24 hours at room temperature to cure. The bond strengths were measured in the tensile shear mode, using conventional tensile testing equipment. The results are summarized in Table I.

TABLE I

| Formulation | Delay Before Assembly, Min. | Average Tensile Strength, DaN/cm² |
| --- | --- | --- |
| A | 0 | 71 |
| A | 5 | 55 |
| B | 0 | 27 |
| B | 5 | 127 |
| C | 0 | 25 |
| C | 5 | 106 |
| D | 0 | 137 |
| D | 5 | 166 |

The data in Table I indicates that formulations containing the divinyl ether show improvements in bond strengths corresponding to increasing vinyl ether content.

EXAMPLE 4

A formulation identical to Formulation A described in Example 3 was prepared with the exceptions that the amount of 2,6-di-tert-butyl-4-methyl phenol was reduced from 0.15 grams to 0.05 grams and the amount of di-p-tolyl iodonium hexafluororphosphate was increased from 0.15 grams to 1.5 grams. This formulation will be referred to as Formulation E.

A second formulation was prepared in which 10.0 grams of Formulation E was mixed with 1.0 grams of 1,4-butanediol divinyl ether. This formulation will be referred to as Formulation E.

Two grams of each formulation were poured into separate 12 mm by 75 mm Pyrex test tubes and heated at 82° C. The time taken for gelation to occur was measured as 24 minutes for Formulation E and 104 minutes for Formulation F. Both formulations were useful as light-activated anaerobic adhesives.

EXAMPLE 5

A formulation identical to Formulation A described in Example 3 was prepared with the exceptions that the amount of 2,6-di-tert-butyl-4-methyl phenol was reduced from 0.15 grams to 0.05 grams and the di-p-tolyl iodonium hexafluoro-phosphate was replaced by 0.142 grams of UVE 1014 (trademark of General Electric), a commercially available sulfonium salt of a complex halogenide. This formulation will be referred to as Formulation G.

A second formulation was prepared in which 10.0 grams of Formulation G was mixed with 1.0 gram of 1,4-butanediol divinyl ether. This formulation will be referred to as Formulation H.

Preparation, irradiation, assembly and testing of bonds was conducted as described in Example 3 with the exception that irradiation was conducted for 60 seconds at an intensity of 25 mw/cm 2. Results are summarized in Table II.

TABLE II

| Formulation | Delay Before Assembly, Min. | Average Tensile Strength, DaN/cm$^2$ |
|---|---|---|
| G | 0 | 104 |
| G | 5 | 91 |
| H | 0 | 193 |
| H | 5 | 176 |

The stabilities of the formulation were measured as outlined in Example 4. Formulation G had a gel time of 180 minutes; Formulation H had a gel time of 245 minutes.

We claim:

1. In a curable composition activatable by a strong acid comprising an acrylic monomer selected from the group comprising di- and poly-(meth)acrylate esters and monofunctional (meth)acrylate esters having a polar group selected from labile hydrogen, heterocyclic ring, hydroxy, amino, cyano, and halogen groups; a peroxy initiator; and a ferrocene compound, the improvement comprising that the composition further comprises from 0.5–20% of a vinyl ether monomer.

2. An activated composition as in claim 1 further comprising said strong acid.

3. A cured composition as in claim 2.

4. A composition as in claim 2, wherein said strong acid is selected from saccharin, perchloric acid, sulfonic acids, phosphonic acids, maleic acid, acetylene carboxylic acid, acetylene dicarboxylic acid or malonic acid.

5. A composition as in claim 1 further comprising a compound which decomposes upon exposure to actinic radiation to release a strong acid.

6. A composition as in claim 5 wherein the radiation decomposible compound is a salt of a complex halogenide having the formula $[A]_d^+[MX_e]^{-(e-f)}$ where A is a cation selected from the group consisting of iodonium, sulfonium, thiopyrylium and diazonium cations, M is a metalloid, X is a halogen radical, d=e−f, f=the valence of M and is an integer equal to from 2 to 7 inclusive, e is greater than f and is an integer having a value up to 8.

7. The composition of claim 1 wherein the peroxy initiator is an organic hydroperoxide.

8. The composition of claim 7 wherein the organic hydroperoxide is present at levels of between 0.1 and 10% by weight of the composition.

9. The composition of claim 7 wherein the organic hydroperoxide is selected from cumene hydroperoxide, t-butyl hydroperoxide and methylethylketone hydroperoxide.

10. The composition of claim 1 wherein the ferrocene compound is selected from ferrocene, t-octyl ferrocene, acetyl ferrocene, benzoyl ferrocene, hydroxyethyl ferrocene, 1,1'-dibutyl ferrocene, n-butyl ferrocene and ferrocene polymers.

11. The composition of claim 1 wherein the vinyl ether monomer is represented by one of the following formulas: 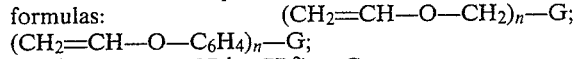 $(CH_2=CH-O-C_6H_4)_n-G$; $(CH_2=CH-O-CR^1=CR^2)_n-G$; or $(CH_2=CH-O-C\equiv C)_n-G$, or ketene acetals such as those of the formula:

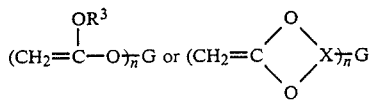

where n is an integer greater than or equal to one; G is a mono or multivalent radical free of groups which intefere with cationic or free radical polymerization; $R^1$ and $R^2$ are selected from H, hydrocarbonyl or substituted hydrocarbonyl; $R^3$ is hydrocarbonyl or substituted hydrocarbonyl; and Y is a hydrocarbonyl group having between 1 and 5 carbon atoms.

12. The composition of claim 11 wherein n is greater than 1.

13. The composition of claim 11 wherein the vinyl ether is selected from n-butyl vinyl ether, 1,4-butanediol divinyl ether, 2-chloroethyl vinyl ether and ethyl vinyl ether.

14. A process of sealing or bonding substrates which comprises applying to at least one of said substrates an activated composition as in Claim 2, and joining said substrates until said composition has cured sufficiently to bond or seal said substrates.

15. The process of claim 14 wherein said applying step comprises: (a) applying a composition comprising said acrylic monomer, peroxy initiator, ferrocene compound, and vinyl ether monomer ingredients, and a compound which decomposes upon exposure to actinic radiation to release a strong acid, to said substrate; and (b) irradiating said composition to release the strong acid.

16. A method as in claim 14 wherein the applying step comprises applying to at least one of said substrates a primer comprising at least one of said strong acid or said ferrocene ingredients and subsequently applying to at least one of said substrates a composition comprising the remaining ingredients of said activated composition.

17. A method as in claim 14 wherein said composition is activated in bulk prior to said applying step.

* * * * *

UNITED STATES PATENT OFFICE
CERTIFICATE OF CORRECTION

Patent No. 4,525,232              Dated  June 25, 1985

Inventor(s) John M. Rooney, John Woods, Paul Conway

It is certified that error appears in the above-identified patent and that said Letters Patent are hereby corrected as shown below:

--Formulation E, which appears at column 4, line 58 should be --Formulation F--.

Signed and Sealed this

Tenth Day of June 1986

[SEAL]

Attest:

DONALD J. QUIGG

Attesting Officer    Commissioner of Patents and Trademarks